United States Patent [19]
Holt

[11] 4,047,329
[45] Sept. 13, 1977

[54] DUAL PURPOSE CONTAINER

[75] Inventor: William Gilbert Holt, Raynham, Mass.

[73] Assignee: Hercules Incorporated, Wilmington, Del.

[21] Appl. No.: 646,131

[22] Filed: Jan. 2, 1976

[51] Int. Cl.² .......................... A01G 9/02; A01G 9/04
[52] U.S. Cl. ............................................. 47/66; 47/71; 47/74; 220/69; 220/306
[58] Field of Search ...................... 47/34, 34.1, 35, 37, 47/38, 38.1, 66, 71, 73, 74; 220/69, 306; 206/423; 106/169 R

[56] References Cited

U.S. PATENT DOCUMENTS

| 752,370 | 2/1904 | Balsley ................................. 47/34 R |
| 1,710,878 | 4/1929 | Kelso ................................... 47/34 R |
| 2,810,234 | 10/1957 | Blackburn et al. .................... 47/34.1 |
| 3,051,303 | 8/1962 | Daanen et al. ...................... 220/69 X |
| 3,079,037 | 2/1963 | Schechter .......................... 220/69 X |
| 3,174,940 | 3/1965 | Lacoste .................................. 47/34 |
| 3,278,521 | 10/1966 | King ................................. 106/169 X |
| 3,606,074 | 9/1971 | Hayes ............................... 220/69 X |
| 3,852,913 | 12/1974 | Clendinning et al. .................. 47/37 |
| 3,943,661 | 3/1976 | Devito et al. ........................... 47/35 |
| 3,949,524 | 4/1976 | Mickelson .......................... 47/34 R |
| D. 110,286 | 6/1938 | Krehbiel .............................. 47/34 X |

Primary Examiner—Edgar S. Burr
Assistant Examiner—James R. Feyrer
Attorney, Agent, or Firm—James W. Peterson

[57] ABSTRACT

The invention is a dual purpose container and lid for foods, cosmetics, medicines, nursery products and the like which is convertible to a flower pot. The container body and lid incorporate structural features which facilitate removal of the primary product from the container and utilization of the container for potting, the lid of said container being removable for use as a base for said container.

6 Claims, 6 Drawing Figures

U.S. Patent  Sept. 13, 1977  Sheet 1 of 3  4,047,329 ary product.

DUAL PURPOSE CONTAINER

BACKGROUND OF THE INVENTION

It is known to utilize an empty container in which food products have originally been packed as a potting container and to utilize the lid for said container as a saucer. U.S. Pat. No. 1,778,175 illustrates a metal receptacle having prepunched side holes and a complementary lid, said lid capable of functioning as a base or saucer. The instant invention is an improvement over such a receptacle, said improvement providing a cosmetically attractive container having a textured outside for appearance and a smooth polished inside facilitating release of primary and secondary products while also reducing the possibility of droplet formation which might adversely affect a plant growing in a secondary product. The instant invention provides a dual purpose container made of chemically resistant material which provides heat transfer and superior drainage and aeration for a secondary product. In an alternate embodiment, the container may be made from biodegradable material which will promote plant growth.

OBJECTS OF THE INVENTION

It is a primary object of the instant invention to provide a container and lid that is aesthetically pleasng in appearance and which functions as a shelf container for primary products and which doubles as a potting container.

It is another object of the instant invention to provide a container and lid which facilitates easy removal of primary and secondary products and which prevents droplet formation on the insides of the container.

It is yet another object of the instant invention to provide a container structured for high strength and freedom from leftover product contamination.

It is still another object of the instant invention to provide a container having removable sections for secondary product aeration and drainage.

It is even another object of the instant invention to provide a container having integral leg portions which facilitate drainage of the secondary product and which provides stability for the container on conventional loading conveyors.

Finally, it is an object of the instant invention to provide a dual purpose container which may be either chemically resistant to primary and secondary products or which is biodegradable and useful for promoting the growth of a secondary product.

SUMMARY OF THE INVENTION

The purpose of the instant invention is to provide a superior dual purpose container which doubles as a package for a primary product and as potting means for a secondary product. To accomplish this purpose, the instant invention provides a unique design which facilitates product removal, prevents leftover product contamination, converts for superior aeration and drainage and which is loadable by conventional filling equipment.

DESCRIPTION OF THE PREFERRED EMBODIMENT

Figure 1:
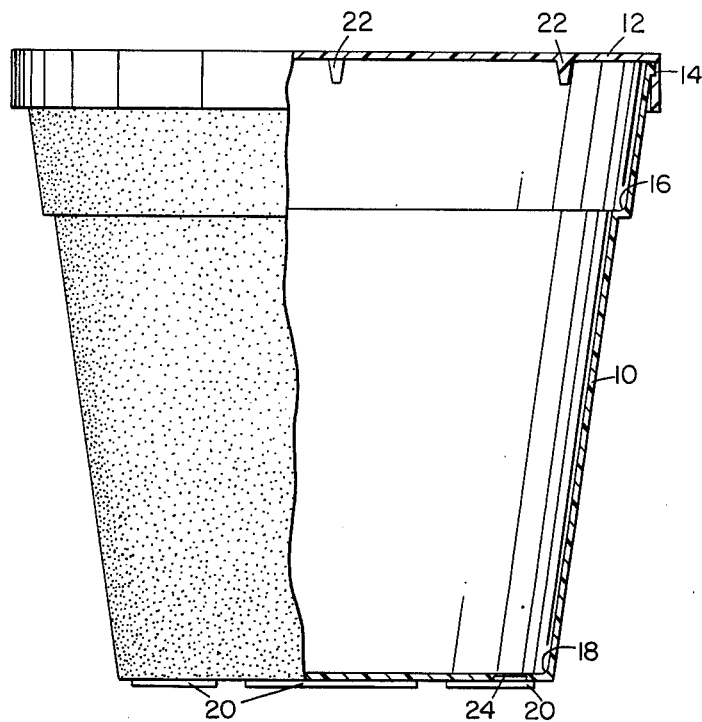
FIG. 1 illustrates in partial cross section the container and lid of the instant invention with the lid in position for enclosing a primary product.

With continued reference to the drawing, FIG. 1 illustrates container 10 with lid 12 affixed thereto. Locking flange 14 is provided to positively seal lid 12 to container 10. Note container 10 is designed with inside radii or fillets at junctions 16 and 18. Container 10 is also provided with near full circumference feet 20, which will be discussed later. The lip of container 10 can be provided with an interlock flange, as shown at 14, or may be made with a rounded extended lip (not shown) to interlock with a standard metal can plastic lid. The lip illustrated accepts the special plastic container lid 12 which is compatible with the aesthetics of the flower pot design of the container 10. Note that lid 12 is provided with concentrically spaced lugs 22, which will also be discussed later.

Figure 2:
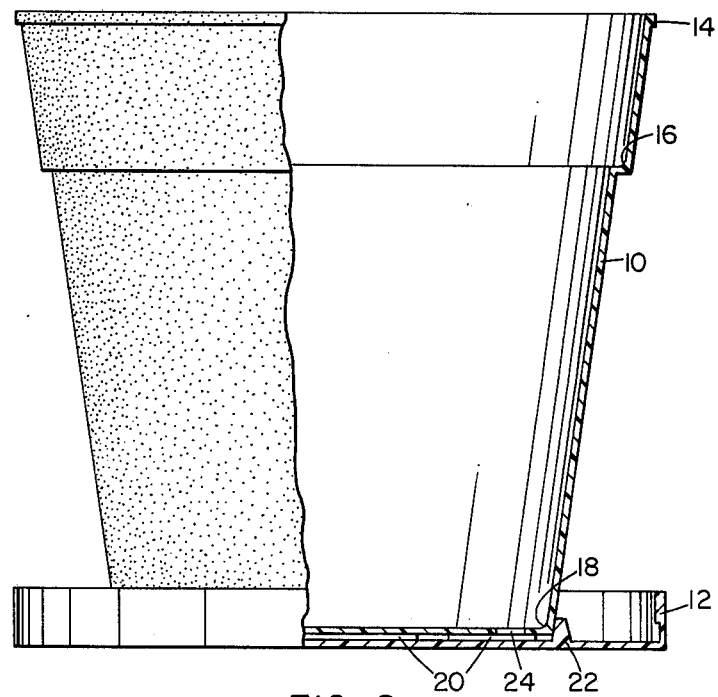
FIG. 2 illustrates in partial cross section the container and lid of the instant invention with the lid in position for holding a secondary product.

FIG. 2 illustrates the container and lid of the instant invention in which the lid 12 is utilized as a saucer for the container 10. Prethinned hole areas 24 have been punched through in FIG. 2 after the primary product has been removed to provide drainage for the container 10. Legs 20 provide the necessary elevation for drainage of the container. Lugs 22 provide concentric centering of the container 10 with respect to the lid 12 and may be so spaced as to provide a force fit to hold the lid 12 to the base of container 10 when used as a hanging pot.

Figure 3:
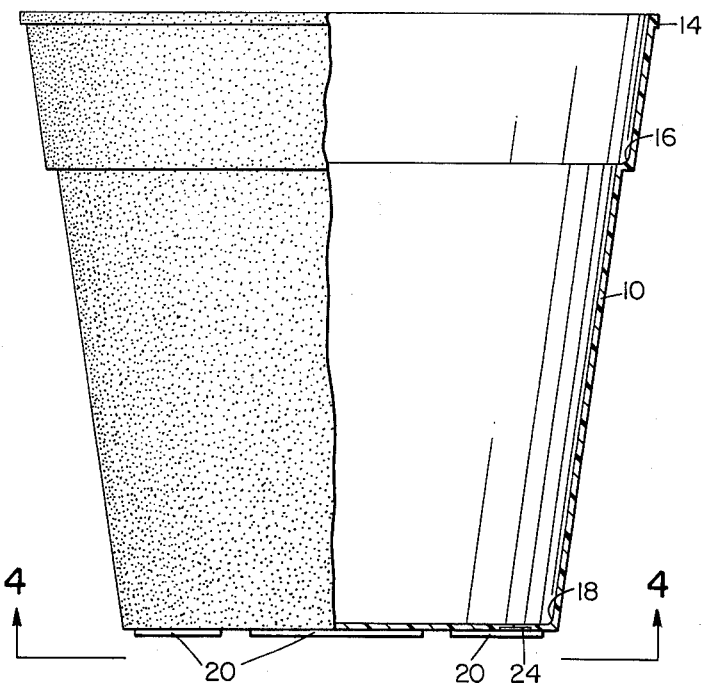
FIG. 3 illustrates in partial cross section a side view of the container of the instant invention.
Figure 4:
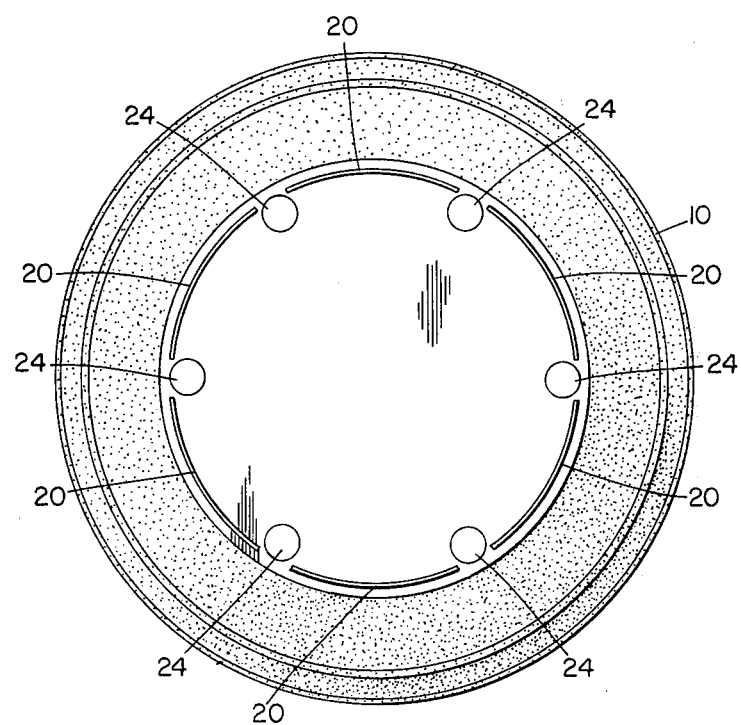
FIG. 4 illustrates a bottom view of the container of the instant invention shown in FIG. 3.

FIGS. 3 and 4 illustrate container 10 of the instant invention. Fillets at junctions 16 and 18 provide additional strength to permit the container from fracturing if accidentally dropped. The inside radius of the fillets at junctions 16 and 18 facilitates removal of primary and secondary materials from the container and also prevents material buildup and contamination within the container. The smooth double tapered structure of the container 10 facilitates release of both primary and secondary products. Prethinned hole areas 24 may be easily punched out as mentioned earlier when the container is used for potting. It is important to note that the holes in the instant container are on the bottom and not on the sides, thus enabling the container to fully drain. Large diameter holes are provided for drainage and the necessary aeration of plant life. The container is also provided with near full circumference feet 20, which are spaced to provide narrow drainage slots directly in line with the holes 24. The near full circumference feet 20 provide stability as well as drainage. The full feet allow the container to traverse conventional product loading conveyors without catching or hanging up in the conveyors.

The outside finish of the container 10 is matted for aesthetic appeal. The inside of the container 10 is smooth and slick. The inside finish and general tapered shape of the container reduces the possibility of droplet formation on the inside of the container. Droplets on the inside of the container, when used for its secondary purpose as a planting container, adversely affect the plant. It is highly desirable to provide means such that all water drains directly into the soil. It is within the scope of the instant invention to coat the inside of the container 10 with product compatible antibeading, i.e., wetting agents to further prevent droplets from forming on the sides of the container.

The container and/or lid of the instant invention may be made of plastic of the food grade type. Specifically, a polyolefin material, such as polypropylene or polyethylene, may be utilized. Polyolefin materials are chemically resistant and are neutral materials as far as growing of plants are concerned. These materials do not give off vapors which affect plant growth and are crack and chip resistant, unlike styrene or clay containers.

It is important to note that polyolefin materials, discussed previously, may be utilized and have the beneficial effect of transmitting thermal radiation through the container to the soil and roots of the plant, when translucent materials are utilized.

It is within the scope of the invention to make the container 10 of biodegradable material. In this way, it would be possible to sell prepotted bulbs, seeds, or plants which could be packed in various combinations of such materials as Vermiculite, peat moss, bark and sand. The biodegradable container would also contain fertilizing material, thus providing a container which could be used as a flower pot in which the plant is watered, the nitrogen fertilizing action being released to feed the plant during its residence in the pot. The container could then be implanted into the ground and the biodegradable action would take place simultaneous with leachable fertilizing action to promote the growth of the plant.

Any water-soluble thermoplastic material could be used to prepare the container of this invention. However, it is preferred to use water-soluble thermoplastic hydroxypropyl cellulose having an M.S. of 2 to 10. The term "M.S." as used herein means the average number of moles of reactant (propylene oxide) combined with the cellulose per anhydroglucose unit. This material is commercially available as Klucel hydroxypropyl cellulose. Thermoplastic hydroxypropyl cellulose and its manufacture are described in U.S. Pat. No. 3,278,521 to E. D. Klug, dated Oct. 11, 1966. Other suitable water-soluble thermoplastic substances which can be used to prepare the container of this invention include polyvinyl alcohol, polyethylene oxide, methyl cellulose and hydroxypropylmethyl cellulose.

Any normally solid fertilizer which preferably can withstand the heat of injection molding can be used as the fertilizer component dispersed in the water-soluble thermoplastic material. However, it is particularly preferred to use a slow release nitrogenous fertilizer, such as ureaform.

Ureaform, as is well known, is the acid catalyzed polymeric condensate of urea and formaldehyde at a urea to formaldehyde mole ratio in the range from about 1:1 to about 2:1. This normally solid material comprises a water-soluble mostly crystalline low molecular weight fraction and a water-insoluble largely noncrystalline glassy-like fraction. A preferred ureaform is one made from urea and formaldehyde having a mole ratio on the range from about 1.2:1 to about 1.5:1, most preferably from about 1.4:1, and having these specifications:

| | Percent |
|---|---|
| Water Insoluble Nitrogen (WIN) | 24-28 |
| Total Nitrogen | 38-39 |
| Activity Index (AI) | 40 |

["Urea formaldehyde Fertilizers", Kravlovic, R. D., and Morgan, W. A., *Agriculture and Food Chemistry*, Vol. 2, No. 2, pages 92-94 (1954); Association of Official Agricultural Chemists, "Official Methods of Analysis", 9th Ed. (1960) page 15.]

To inhibit degradation of hydroxypropyl cellulose, a stabilizer can be added to the composition. Suitable stabilizers include butylated hydroxytoluene, dilauryl thiodipropionate, and the sodium, potassium and calcium salts of benzoic, propionic and sorbic acids and/or polymeric materials such as low density polyethylene and low molecular weight waxy material, such as amorphous polypropylene.

To improve stiffness and rigidity of the container, it is preferred to add a minor (compared to the water-soluble thermoplastic material) amount of a stiffening agent, such as polystyrene, polyproplene and polyethylene. It is also possible to improve stiffness by adding major amounts of degradable fillers, such as calcium carbonate, starches and clay.

Figure 5:
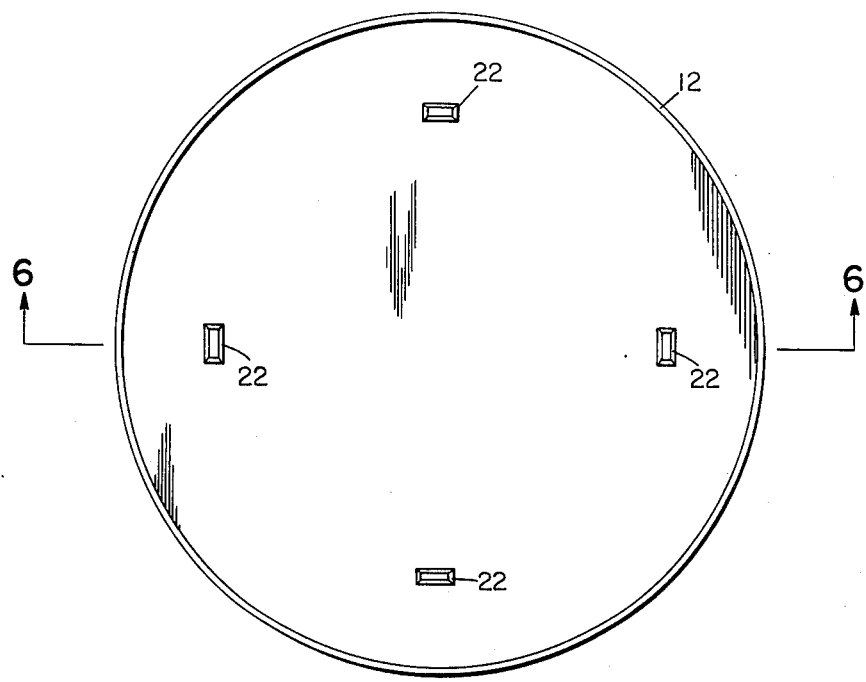
FIG. 5 illustrates a top view of the inside of the lid of the instant invention.
Figure 6:
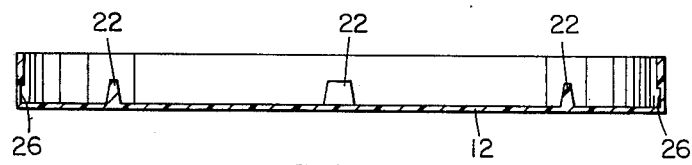
FIG. 6 illustrates in full section the lid of the instant invention shown in FIG. 5.

FIGS. 5 and 6 illustrate the preferred lid 12 of the instant invention having a skirt portion. The inside of said skirt being complementary with the open top of said container 10 to seal said container. The detents 26 provide positive interlock with flange 14, discussed earlier.

It is understood that the invention is not limited to the precise construction shown, but that changes are contemplated as readily fall within the spirit of the invention, as shall be determined by the scope of the appended claims.

What I claim and desire to protect by Letters Patent is:

1. A dual purpose container comprising:
   a container having a double tapered sidewall, the outside of said wall being textured and the inside of said wall being smooth to facilitate material slippage, said container having an open top and a closed bottom, said top having a radially outwardly projecting locking flange, said bottom having a plurality of prethinned portions, said prethinned portions removable to provide aeration to the container, said container having a plurality of concentric feet members providing essentially a full circumference concentric ring, said feet being spaced to provide narrow slot openings directly opposite said prethinned areas of said container bottom, the junctions of said double taper sidewall to each other and to the bottom being rounded with fillets to provide additional impact strength, to facilitate removal of materials and to prevent material buildup at the junctions; and
   a lid having a skirt portion, the inside of said skirt portion being complementary with the locking flange to seal the top of said container, said lid having a plurality of concentrically spaced lugs on the inside thereof complementary with the periphery of the bottom of said container to provide concentric centering for the bottom of said container and drainage through said prethinned portions and said slot openings when said lid is removed and placed on the bottom of said container as a saucer.

2. A container as in claim 1 wherein the container is composed of translucent polyolefin material to allow transmission of thermal radiation through the container.

3. A container as in claim 2 wherein said concentrically spaced lugs provide a force fit with the bottom of said container so that the container and lid may be used as a hanging pot.

4. A container as in claim 3 wherein the inside of said sidewall is coated with a wetting agent to prevent the formation of water droplets on the inside of the container.

5. A container as in claim 1 wherein the container is composed of water-soluble thermoplastic hydroxypropyl cellulose and nitrogenous fertilizer.

6. A container as in claim 5 wherein the water-soluble thermoplastic hydroxypropyl cellulose has an M. S. of 2 to 10.

* * * * *